(12) United States Patent
Shimizu et al.

(10) Patent No.: US 12,495,495 B2
(45) Date of Patent: Dec. 9, 2025

(54) WIRING BOARD, IMAGE PICKUP UNIT, ENDOSCOPE, AND METHOD FOR MANUFACTURING WIRING BOARD

(71) Applicant: OLYMPUS MEDICAL SYSTEMS CORP., Tokyo (JP)

(72) Inventors: Toshiyuki Shimizu, Tokyo (JP); Kenjiro Kanno, Komagane (JP)

(73) Assignee: OLYMPUS MEDICAL SYSTEMS CORP., Tokyo (JP)

( * ) Notice: Subject to any disclaimer, the term of this patent is extended or adjusted under 35 U.S.C. 154(b) by 0 days.

(21) Appl. No.: 18/757,955

(22) Filed: Jun. 28, 2024

(65) Prior Publication Data

US 2025/0016922 A1  Jan. 9, 2025

Related U.S. Application Data

(60) Provisional application No. 63/524,950, filed on Jul. 5, 2023.

(51) Int. Cl.
| | |
|---|---|
| *H05K 1/11* | (2006.01) |
| *A61B 1/00* | (2006.01) |
| *A61B 1/05* | (2006.01) |
| *H04N 23/50* | (2023.01) |
| *H04N 23/54* | (2023.01) |
| *H05K 1/02* | (2006.01) |

(52) U.S. Cl.
CPC ............ *H05K 1/113* (2013.01); *A61B 1/0011* (2013.01); *A61B 1/051* (2013.01); *H04N 23/54* (2023.01); *H04N 23/555* (2023.01); *H05K 1/0296* (2013.01); *H05K 2201/10151* (2013.01)

(58) Field of Classification Search
CPC ................. H05K 1/113; H05K 1/0296; H05K 2201/10151; H05K 1/11; H05K 1/111; H05K 1/181; A61B 1/0011; A61B 1/051; A61B 1/00064; A61B 1/005; A61B 1/05; H04N 23/54; H04N 23/555
See application file for complete search history.

(56) References Cited

U.S. PATENT DOCUMENTS

| | | | | |
|---|---|---|---|---|
| 2003/0141103 A1* | 7/2003 | Ng | ......................... | H05K 1/111 174/250 |
| 2011/0133224 A1* | 6/2011 | Zoorob | ............... | H01L 25/0753 257/E33.056 |
| 2015/0155439 A1* | 6/2015 | Cich | ..................... | H10H 20/825 362/296.09 |
| 2017/0208689 A1* | 7/2017 | Fukuzumi | ................ | H05K 1/09 |
| 2018/0168046 A1* | 6/2018 | Miyawaki | .............. | A61B 1/042 |
| 2023/0066243 A1* | 3/2023 | Li | .......................... | G06F 3/0446 |
| 2025/0006429 A1* | 1/2025 | Miyauchi | ............... | H01G 4/232 |

FOREIGN PATENT DOCUMENTS

| | | |
|---|---|---|
| JP | 2017023234 A | 2/2017 |
| JP | 2020181856 A | 11/2020 |
| WO | 2021181530 A1 | 9/2021 |
| WO | 2024053097 A1 | 3/2024 |

* cited by examiner

*Primary Examiner* — Nasim N Nirjhar
(74) *Attorney, Agent, or Firm* — Scully, Scott, Murphy & Presser, P.C.

(57) ABSTRACT

A wiring board has a first principal surface including one or more first pads configured to bond an electronic component, one or more second pads configured not to bond another member, one or more wiring patterns connecting the one or more first pads to the one or more second pads, respectively, and a solder nonwetting region is formed on each of the one or more second pads.

13 Claims, 8 Drawing Sheets

WIRING BOARD, IMAGE PICKUP UNIT, ENDOSCOPE, AND METHOD FOR MANUFACTURING WIRING BOARD

RELATED APPLICATION DATA

This application is based on and claims priority under 35 U.S.C. § 119 to U.S. Provisional Application No. 63/524, 950, filed on Jul. 5, 2023, the entire contents of which are incorporated herein by reference.

BACKGROUND

1. Field

The present disclosure relates to a wiring board to which an electronic component is bonded by soldering, an image pickup unit including a wiring board to which a camera unit is bonded by soldering, and an endoscope including an image pickup unit including a wiring board to which a camera unit is bonded by soldering.

2. Description of the Related Art

Recently, a three-dimensional circuit device such as a molded interconnect device (MID) has been used for downsizing and high functionality of an electronic device.

Japanese Patent Application Laid-open Publication No. 2017-23234 discloses a camera unit of an endoscope including a variant circuit board that is a three-dimensional circuit device. The camera unit includes an image pickup device, a flat wiring board (flat plate wiring board) on which an electronic component is mounted, and a variant circuit board (three-dimensional wiring board). A plurality of cables are bonded to each of a plurality of side surfaces of the variant circuit board.

International Publication No. 2021/181530 discloses an image pickup unit with a camera unit mounted in a cavity of a molded interconnect device. An external electrode of the camera unit is connected to a signal cable via a through wire with a through-hole penetrating through a bottom surface of the cavity to a back surface.

If solder flows into the through-hole when the camera unit is bonded to the three-dimensional circuit device by soldering, it has been possible that not only bonding reliability decreases but also the camera unit is moved from a predetermined position. If an optical axis of the camera unit is displaced from a predetermined position, it has been possible that a desired visual field is not obtained and performance of an image pickup apparatus decreases.

Japanese Patent Application Laid-open Publication No. 2020-181856 discloses a wiring board in which a gold layer on a surface of a wire is removed and diffused through laser irradiation to expose a nickel layer below the gold layer so that solder is prevented from flowing to the wire.

SUMMARY

A wiring board according to an aspect includes: a first principal surface, the first principal surface includes: one or more first pads configured to bond an electronic component, one or more second pads configured not to bond another member, one or more wiring patterns connecting the one or more first pads to the one or more second pads, respectively, and a solder nonwetting region is formed on each of the one or more second pads.

An image pickup unit according to an aspect includes: a wiring board includes: a first principal surface, the first principal surface includes: one or more first pads, one or more second pads, and one or more wiring patterns connecting the one or more first pads to the one or more second pads, respectively, and a second principal surface opposite the first principal surface, and a camera unit bonded to the one or more first pads by solder, a solder nonwetting region is formed on each of the one or more second pads, the solder nonwetting region is not bonded to another member by solder.

An endoscope according to an aspect includes: an image pickup unit at a distal end portion of an insertion portion, the image pickup unit includes: a wiring board having a first principal surface and a second principal surface opposite the first principal surface, the first principal surface having one or more first pads, one or more second pads, and one or more wiring patterns disposed on the first principal surface, the one or more wiring patterns connecting the one or more first pads to the one or more second pads, respectively; and a camera unit bonded to the one or more first pads by solder, and a solder nonwetting region is formed on each of the one or more second pads, the solder nonwetting region is not bonded to another member by solder.

A method for manufacturing a wiring board for use with an endoscope according to an aspect includes: molding a substrate, forming one of more first pads, one or more second pads, and one or more wiring patterns connecting the one or more first pads and the one or more second pads on a surface of the substrate, plating a first layer and a second layer having lower solder wettability than the first layer on the surface, and forming a solder nonwetting region by removing a part of the first layer to expose a part of the second layer.

DETAILED DESCRIPTION

Figure 1:
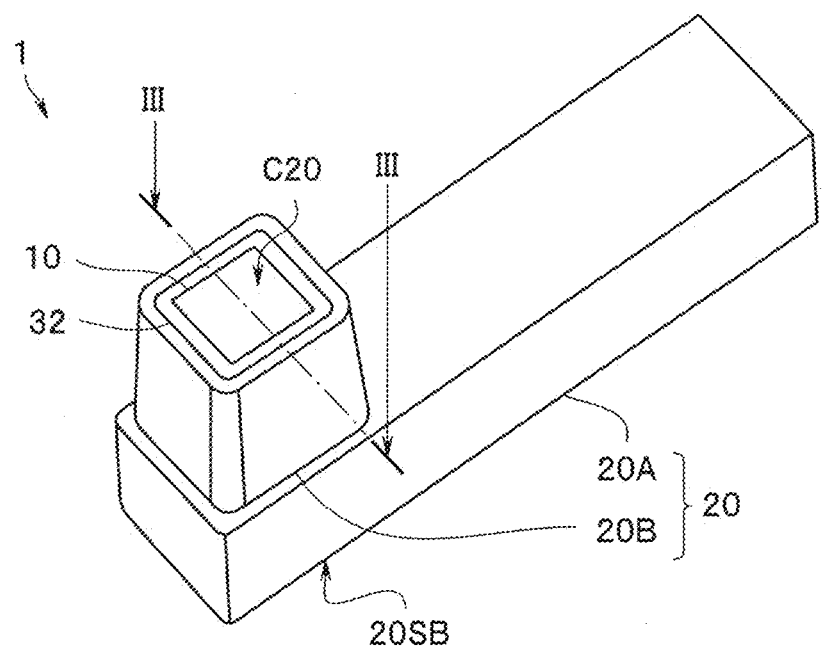
FIG. 1 is a perspective view of an image pickup unit according to a first embodiment.
Figure 2:
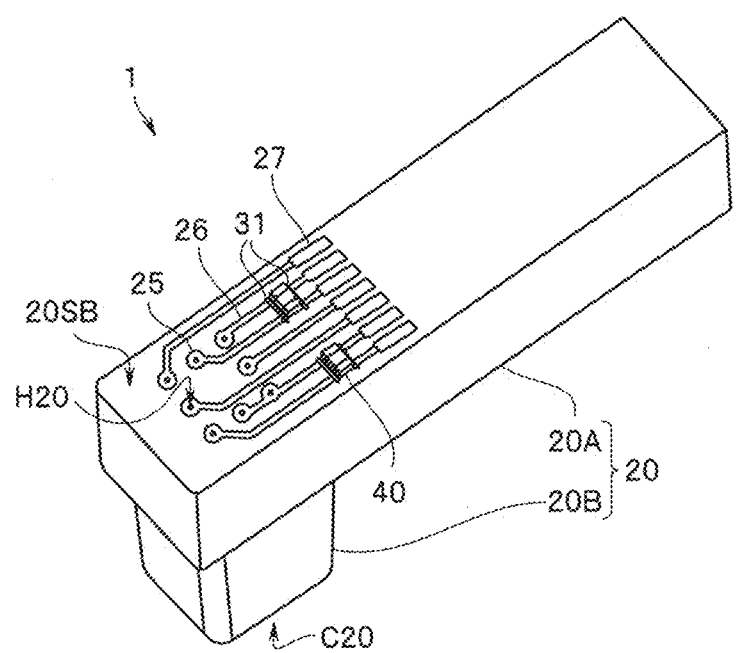
FIG. 2 is a perspective view of the image pickup unit according to the first embodiment.

Embodiments will be described below with reference to the accompanying drawings.

Note that diagrams based on embodiments are schematic. A relation between a thickness and a width of each part, a thickness ratio of each part, and the like are different from those in reality. The drawings include parts between which a dimensional relation and a ratio are different.

First Embodiment

FIGS. 1 to 4 illustrate an image pickup unit 1 including a wiring board 20 according to the present embodiment. The image pickup unit 1 includes the wiring board 20 and a camera unit 10 that is an electronic component. The wiring board 20 is a three-dimensional wiring board that is a molded interconnect device (MID) as described later.

The wiring board 20 is a three-dimensional (stereoscopic) molded interconnect device in which a plurality of conductor patterns and the like are disposed on a three-dimensional molding base made of resin by injection molding. Unlike a flat wiring board, the wiring board 20 has a functional shape and has a tilt surface, a vertical plane, a curved surface, a through-hole, or the like on which conductor patterns can be disposed.

The wiring board 20 includes an assembly member 20A and a protrusion 20B protruding from the assembly member 20A. The protrusion 20B is surrounded by a wall having a frame shape and constitutes a cavity C20 that is a bottomed hole in which the camera unit 10 is housed. A gap between the camera unit 10 housed in the cavity C20 and an inner wall surface 20SS of the cavity C20 is filled with sealing resin 32. Hereinafter, a bottom surface of the cavity C20 is referred to as a first principal surface 20SA, and a surface opposite the first principal surface 20SA is referred to as a second principal surface 20SB.

A plurality of solder resist patterns 31 are disposed on wiring patterns 26 on the second principal surface 20SB. An electronic component such as a chip capacitor 40 is mounted on the surface on two of the wiring patterns 26 between two of the solder resist patterns 31. The solder resist patterns 31 are each disposed for mounting an electronic component on two wiring patterns 26 located in parallel. Although not illustrated, signal cables are bonded to fourth pads 27.

Figure 3:
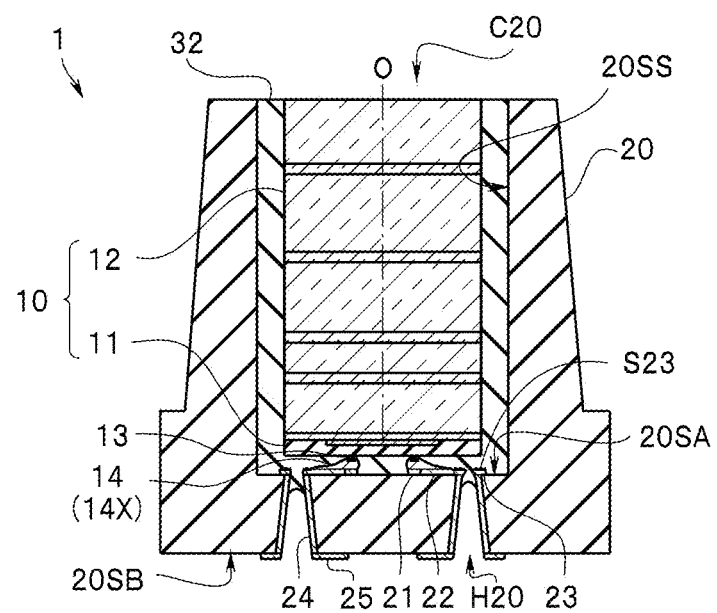
FIG. 3 is a cross-sectional view along line III-III in FIG. 1.
Figure 4:
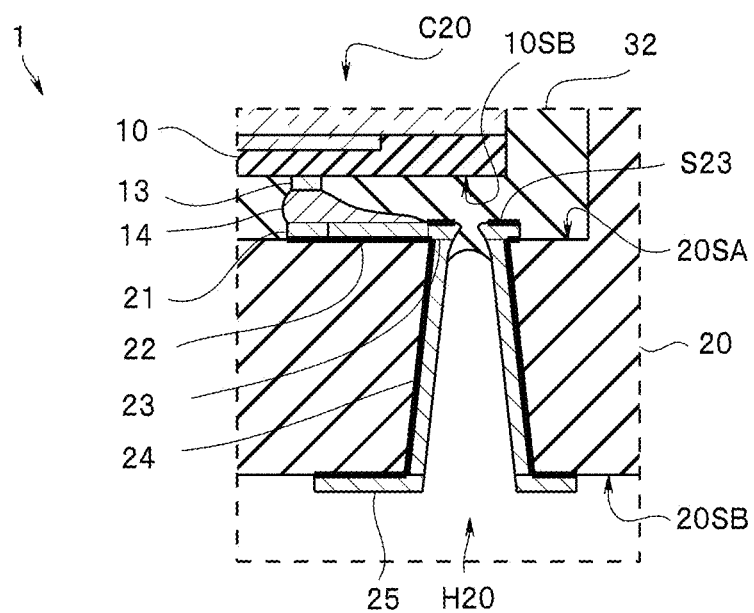
FIG. 4 is a partially enlarged diagram of FIG. 3.

As illustrated in FIGS. 3 and 4, the camera unit 10 includes an imager 11 and an optical element 12. The optical element 12 includes a plurality of lenses. The imager 11 is an image pickup device such as a CCD or a CMOS configured to convert an object image condensed through the optical element 12 into an electric signal.

Figure 5:
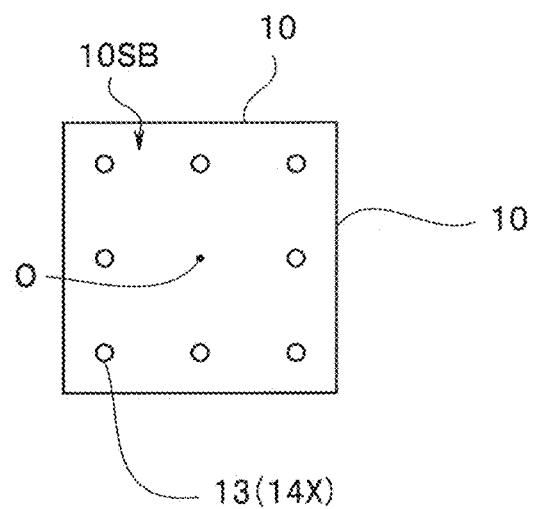
FIG. 5 is a bottom view of a camera unit of the image pickup unit according to the first embodiment.

As illustrated in FIG. 5, a plurality of external electrodes 13 that transmit and receive electric signals are provided on a bottom surface 10SB of the camera unit 10 (imager 11). Solder bumps 14X are disposed on the plurality of external electrodes 13, respectively. The plurality of solder bumps 14X constitute a ball grid array. The camera unit 10 is bonded to the wiring board 20 by solder 14 that is a bonding member, the solder obtained by melting the solder bumps 14X.

Figure 6:
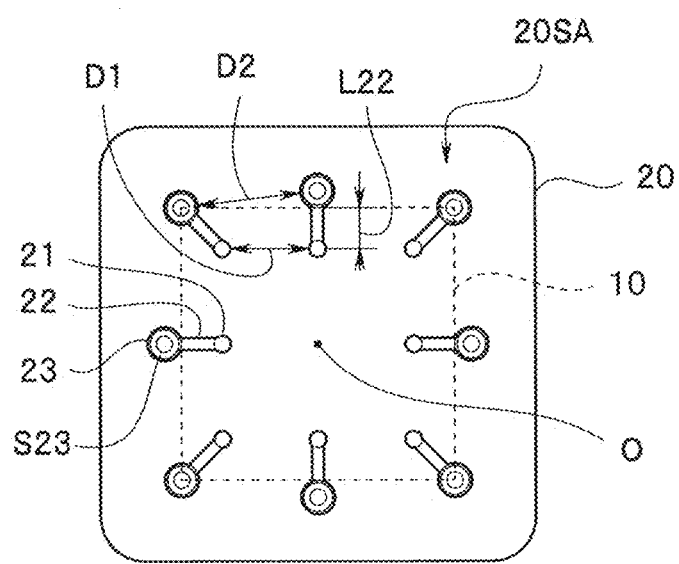
FIG. 6 is a bottom view of a cavity of a wiring board of the image pickup unit according to the first embodiment.

As illustrated in FIG. 6, a plurality of first pads 21, a plurality of wiring patterns 22, and a plurality of second pads 23 are disposed on the first principal surface 20SA of the wiring board 20. The wiring board 20 has a plurality of through-holes H20 penetrating through the first principal surface 20SA and the second principal surface 20SB. Through wiring layers 24 are disposed on inner surfaces of the respective through-holes H20. The second pads 23 are connected to the respective through wiring layers 24. Third pads 25 and the wiring patterns 26 extended from the through wiring layers 24, and the fourth pads 27 provided at end parts of the wiring patterns 26 are disposed on the second principal surface 20SB.

As described later, the first pads 21, the wiring patterns 22, the second pads 23, the through wiring layers 24, the third pads 25, the wiring patterns 26, and the fourth pads 27 are multiple layers of electric conductor films simultaneously deposited by using a plating method, and boundaries between the films are not clear. However, for sake of simplicity, the present specification will be described below with an exemplary configuration in which the second pads 23 are disposed on a first principal surface 10SA and the through wiring layers 24 are extended from bottom surfaces of the second pads 23.

A "pad" means an electrode made of an electric conductor pattern. A "pad" is not limited to, for example, an electrode bonded by soldering nor an electrode provided around a through-hole.

The first pads 21, the wiring patterns 22, the second pads 23, the through wiring layers 24, the third pads 25, the wiring patterns 26, and the fourth pads 27 are each made of a plurality of metal layers. For example, a Cu/Ni/Au multi-layered film in which a nickel layer (Ni) and a gold layer (Au) are sequentially stacked on a copper layer (Cu). The nickel layer (second layer) is a layer for preventing solder diffusion and has low solder wettability. The gold layer (first layer) has extremely high solder wettability. The thicknesses of the Cu, Ni, and Au layers are, for example, 12 µm, 3 µm, and 0.03 µm, respectively.

An inner diameter of each through-hole H20 is larger than twice of a thickness of each through wiring layer 24. Accordingly, the through-hole H20 is not blocked by the through wiring layer 24 and has an opening O23 at the center of the corresponding second pad 23.

As the solder bumps 14X melt when the camera unit 10 (electronic component) is bonded to the wiring board 20 by soldering, the camera unit 10 potentially moves in a direction in which the solder 14 flows. For example, if the solder 14 flows into the through-holes H20 through the openings O23 via the wiring patterns 22, it is possible that bonding between the external electrodes 13 and the first pads 21 weakens or the camera unit 10 is bonded at a tilt.

As illustrated in FIG. 6, the plurality of wiring patterns 22 in the image pickup unit 1 are routed from the plurality of first pads 21 to the plurality of second pads 23 in a symmetric manner with a center at an optical axis O of a bonding region for the camera unit 10, respectively. The second pads 23 are positioned radially outside the respective first pads 21. The radial direction is in the direction outward from the optical axis O. In other words, the second pads 23 are positioned in a region on an outer side of the first pads 21 (region close to an outer edge) on the first principal surface 20SA. The plurality of wiring patterns 22 have substantially equal lengths L22. Accordingly, a second distance D2 between the plurality of second pads 23 adjacent to each other is longer than a first distance D1 between the plurality of first pads 21 adjacent to each other.

Note that "substantially equal lengths" means that the lengths L22 of the respective wiring patterns 22 are more than 90% and less than 110% (including 100%) of an average value of the lengths of the plurality of wiring patterns 22.

Figure 7A:
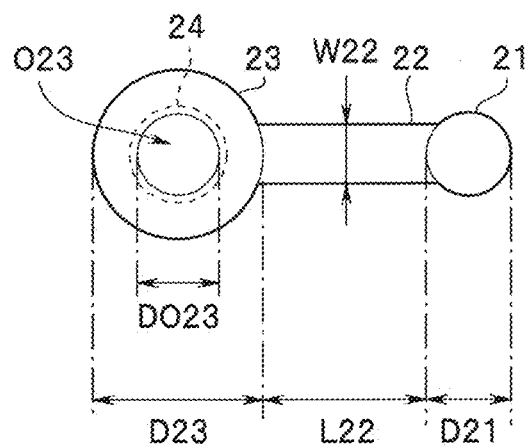
FIG. 7A is a bottom-surface enlarged view of the cavity of the wiring board of the image pickup unit according to the first embodiment.

The image pickup unit 1 has such an extremely small size that a width W22 and the length L22 of each wiring pattern are, for example, 100 μm and 200 μm, respectively, as illustrated in FIG. 7A. FIG. 7A is a partially enlarged diagram of the first principal surface 10SA before solder nonwetting region formation. An outer diameter D21 of each first pad is, for example, 130 μm, and an outer diameter D23 of each second pad is, for example, 250 μm. In other words, area A23 of each second pad 23 is larger than area A21 of each first pad 21. Note that an opening diameter DO23 of the opening O23 of each second pad 23 is, for example, 50 μm to 150 μm.

Figure 7B:
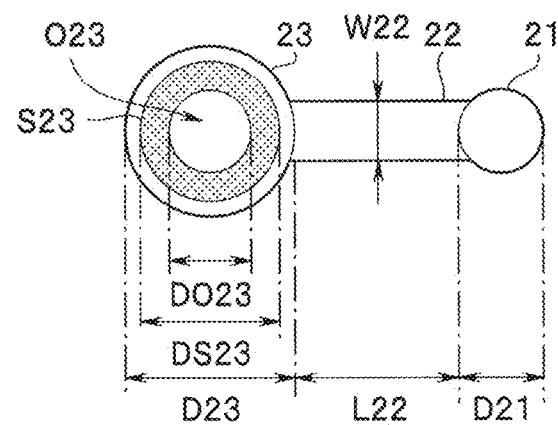
FIG. 7B is a bottom-surface enlarged view of the cavity of the wiring board of the image pickup unit according to the first embodiment before solder nonwetting region formation.

As illustrated in FIG. 7B, a solder nonwetting region S23 in a ring shape is formed around the opening O23 on each second pad 23. An outer diameter DS23 of the solder nonwetting region S23 is smaller than the outer diameter D23 of the second pad 23. An inner diameter of the solder nonwetting region S23 is substantially equal to the opening diameter DO23 of the opening O23 of the second pad 23.

As described later, the solder nonwetting region S23 is a region in which the gold layer of the second pad 23 is removed and diffused through laser irradiation and the nickel layer below the gold layer is exposed.

In the image pickup unit 1, the solder 14 flowing as the camera unit 10 is bonded to the wiring board 20 by soldering does not spread to the solder nonwetting regions S23 and thus does not flow into the through-holes H20 through the openings O23 via the second pads 23. The solder 14 disposed on the plurality of first pads 21 flows into the plurality of respective wiring patterns 22 located in a symmetric manner with respect to a center (the optical axis O) of the camera unit 10. Accordingly, the camera unit 10 is accurately bonded to a predetermined position without moving at bonding.

Since the camera unit 10 is accurately bonded to the predetermined position on the wiring board 20, the image pickup unit 1 achieves high performance.

Note that it is also possible to prevent outflow of the solder 14 by, for example, forming solder nonwetting regions in ring shapes on the first pads 21 to which the camera unit 10 is bonded by soldering. However, in such a case where a solder nonwetting region is formed on a pad bonded by soldering, solder bonding area further decreases, and thus bonding reliability potentially decreases.

For example, the solder bonding area further decreases in a case where solder nonwetting regions are formed on the first pads 21 that are small. However, since the second pads 23 are bonded to no other member by soldering, the reliability does not decrease by forming solder nonwetting regions on the second pads 23.

It is also possible to prevent outflow of the solder 14 by forming solder nonwetting regions on the wiring patterns 22. However, it is not easy to accurately perform laser irradiation on the wiring patterns 22 that have narrow widths. The MID is damaged when resin around the wiring patterns 22 is wrongly irradiated with laser. However, wrong laser irradiation does not occur to the second pads 23, which have relatively large area.

<Image Pickup Unit Manufacturing Method>

Figure 8:
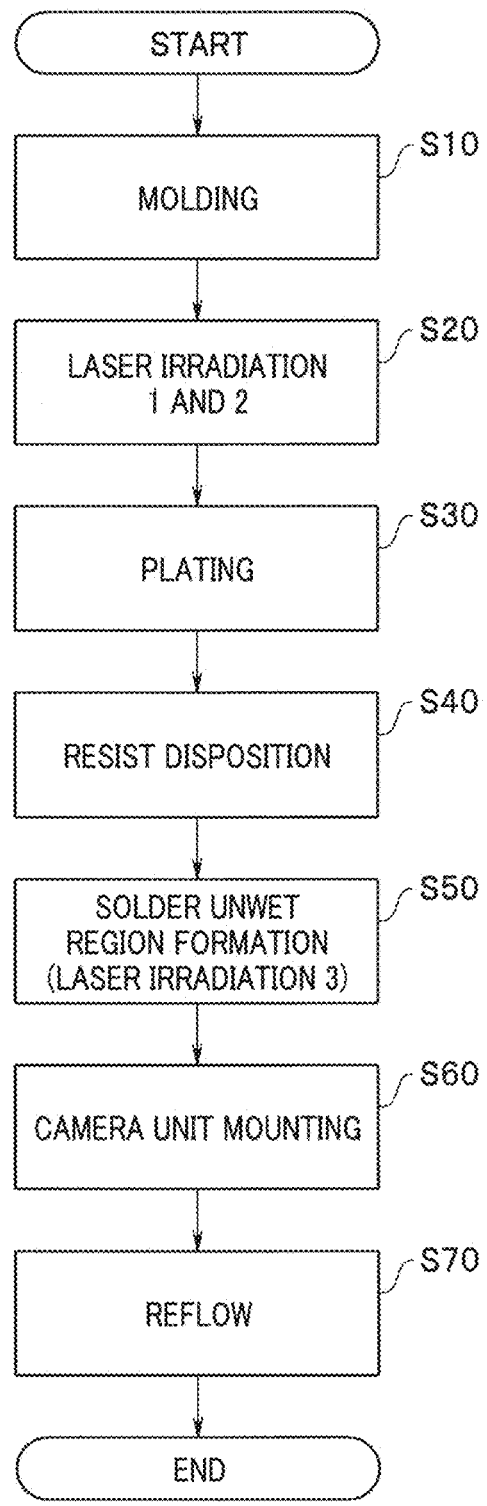
FIG. 8 is a flowchart of a method of manufacturing the image pickup unit according to the first embodiment.

A method of manufacturing the image pickup unit will be described below in accordance with a flowchart of FIG. 8.

<Step S10> Molding Process (Molded Substrate Production)

MID resin is injected into a mold including recesses of an outer shape of the wiring board 20, and a three-dimensional substrate is produced by injection molding. The MID resin contains addition of a precursor such as a non-conductive metal complex that functions as a plating catalyst through light irradiation.

<Step S20> Laser Irradiation Processes 1 and 2 (Through-Hole Formation and Active Layer Formation)

The through-holes H20 extending from the second principal surface 20SB to the first principal surface 20SA are formed through irradiation with first laser at high output power from the second principal surface 20SB of the three-dimensional substrate (laser irradiation 1). An opening of each through-hole H20 is larger at the second principal surface 20SB than at the first principal surface 20SA. An activated catalyst layer is formed on a wall surface of each through-hole H20.

In addition, the first principal surface 20SA and the second principal surface 20SB are subjected to pattern irradiation with second laser to dispose the first pads 21, the wiring patterns 22, the second pads 23, the third pads 25, the wiring patterns 26, and the fourth pads 27. When the molded substrate is irradiated with the second laser, a catalyst layer having a catalytic activity of non-electrolytic plating is formed on the molded substrate (laser irradiation 2).

<Step S30> Plating Process

When subjected to non-electrolytic copper plating, non-electrolytic nickel plating, and immersion gold plating in the stated order, the molded substrate on which the catalyst layer pattern is formed becomes the wiring board 20 with a plurality of conductor patterns disposed at the first principal surface 20SA, the second principal surface 20SB, and the through-holes H20. The plurality of conductor patterns constitute the first pads 21, the wiring patterns 22, the second pads 23, the through wiring layers 24, the third pads 25, the wiring patterns 26, and the fourth pads 27.

As illustrated in FIG. 5, the plurality of external electrodes 13 disposed on the bottom surface 10SB of the camera unit 10 are located at fourfold symmetric positions with a center at the optical axis O. In other words, the plurality of external electrodes 13 are located at positions that are superimposed on each other when rotated by 90° relative to the optical axis O. The solder bumps 14X are disposed on the plurality of external electrodes 13, respectively.

As illustrated in FIG. 6, the plurality of first pads 21, the plurality of wiring patterns 22, and the plurality of second pads 23 are disposed on the first principal surface 20SA of the wiring board 20. The first pads 21 are bonded to the external electrodes 13 of the camera unit 10 by the solder 14.

The wiring patterns 22 are radially extended from the plurality of first pads 21, respectively. The second pads 23 connected to the through wiring layers 24 are disposed at end parts of the wiring patterns 22, respectively.

Note that the plurality of first pads 21, the plurality of wiring patterns 22, and the plurality of second pads 23 are located at fourfold symmetric positions with a center at the optical axis O.

Note that the plurality of external electrodes 13, the plurality of first pads 21, and the like may be located at N-fold symmetric positions (N is a natural number of two or more) with a center at the optical axis O.

<Step S40> Resist (Resin) Disposition Process

The solder resist patterns 31 are disposed on the second principal surface 20SB by using a dispenser.

Note that step S40 may be performed after step S50.

<Step S50> Solder Nonwetting Region Formation (Laser Irradiation Process 3)

The gold layer in at least part of each second pad 23 is removed and diffused through laser irradiation, and accordingly, the corresponding solder nonwetting region S23 in which the nickel layer is exposed are formed. A laser spot diameter is, for example, 5 μm to 150 μm.

Since the laser irradiation is performed on each second pad 23, which has large area, surrounding resin where no electrode is disposed is not irradiated with laser even when an irradiation position is displaced.

Solder wettability is measured by, for example, a "solder tank equilibrium method" defined by Japanese Industrial Standard Z3198-4. The solder wettability is worse in a region where a zero cross time (time until a contact angle becomes 90° after immersion) is longer than in a region where the zero cross time is short. A region where the zero cross time is five seconds or longer is referred to as a solder nonwetting region. Note that the solder wettability is measured by using a solder nonwetting region formed on a test piece under a same condition as at step S50, the test piece having a same configuration as a conductor pattern on the first principal surface 20SA.

<Step S60> Camera Unit Mounting Process

The camera unit 10 is a chip size package (CSP) produced by bonding a glass wafer to a semiconductor wafer on which a plurality of imagers 11 are formed and then cutting the wafer. The size of the camera unit 10 is, for example, a square of 1 mm to 3 mm. In addition, a semiconductor chip configured to process an image pickup signal may be bonded to a back surface of the imager 11 in the camera unit 10.

The camera unit 10 is housed in the cavity C20 in a state in which the plurality of external electrodes 13 are aligned with the plurality of first pads 21, respectively. Solder paste may be applied to the first pads 21 before the camera unit 10 is housed in the cavity C20.

An electronic component having two terminals, for example, the chip capacitor 40 is temporarily fixed between two of the solder resist patterns 31 on the second principal surface 20SB of the wiring board 20. Each terminal of the chip capacitor 40 is provided with, for example, a solder plated film. Solder paste may be applied at bonding positions of the wiring patterns 26. Note that an interval between two wiring patterns 26 located in parallel is substantially equal to an interval between the two terminals of the chip capacitor 40.

<Step S70> Reflow Process

The image pickup unit 1 is heated to a temperature at which the solder 14 melts by using, for example, a reflow furnace. After the image pickup unit 1 returns to room temperature, the external electrodes 13 of the camera unit 10 are bonded to the first pads 21 of the wiring board 20 by soldering. In addition, the chip capacitor 40 is bonded to the wiring patterns 26 by soldering.

After the reflow process, the sealing resin 32 is injected between the cavity C20 and the camera unit 10 and curing treatment is performed, which completes the image pickup unit 1.

In the reflow process, the camera unit 10 potentially moves in a direction in which the solder 14 flows as the solder bumps 14X melt. If the solder 14 flows into the through-holes H20, it is possible that bonding between the external electrodes 13 and the first pads 21 is weakened or the camera unit 10 is bonded at a tilt.

In the image pickup unit 1, the plurality of wiring patterns 22 on which the solder 14 flows have equal widths and equal lengths. In other words, the plurality of wiring patterns 22 on which the solder 14 flows have equal areas after reflow.

The solder 14 flows along the plurality of wiring patterns 22 located at fourfold symmetric positions with respect to the camera unit 10 (optical axis O). Accordingly, the camera unit 10 is automatically and accurately bonded at a desired position by a self-alignment effect in the reflow process. According to the present manufacturing method, the image pickup unit 1 with high performance can be manufactured.

Note that the plurality of first pads 21, the plurality of second pads 23, and the plurality of wiring patterns 22 may be located at N-fold symmetric positions (N is a natural number of two or more).

<Solder Nonwetting Regions and Pads of Image Pickup Unit According to Modification>

An image pickup unit according to a modification of the first embodiment will be described below. The image pickup unit according to the modification is similar to the image pickup unit according to the first embodiment and has same effects as the image pickup unit according to the first embodiment. Thus, description of any same configuration as in the image pickup unit according to the embodiment is omitted.

The shape of each solder nonwetting region S23 can be selected as appropriate from among a plurality of shapes with which the solder 14 does not flow into the through-hole H20 via the opening O23.

Figure 9A:
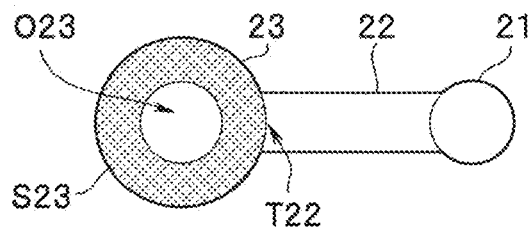
FIG. 9A is a bottom-surface enlarged view of the cavity of the wiring board of an image pickup unit according to a modification of the first embodiment.

The solder nonwetting region S23 in a ring shape illustrated in FIG. 9A is formed on an entire surface of a second pad 23.

Figure 9B:
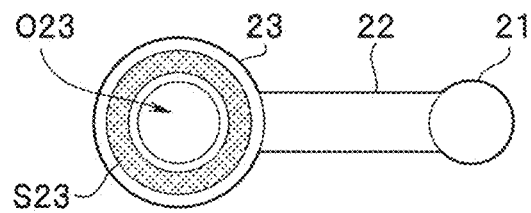
FIG. 9B is a bottom-surface enlarged view of the cavity of the wiring board of the image pickup unit according to the modification of the first embodiment.

The solder nonwetting region S23 in a ring shape illustrated in FIG. 9B has an inner peripheral diameter larger than the opening diameter of the opening O23 and has an outer peripheral diameter smaller than an outer peripheral diameter of the second pad 23.

Figure 9C:
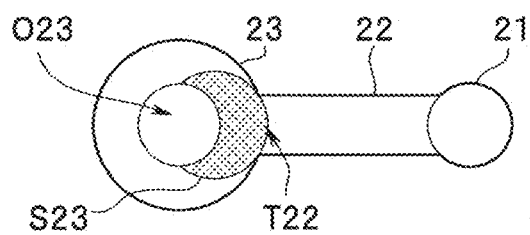
FIG. 9C is a bottom-surface enlarged view of the cavity of the wiring board of the image pickup unit according to the modification of the first embodiment.

The solder nonwetting region S23 illustrated in FIG. 9C has an outer peripheral diameter smaller than the outer peripheral diameter of the second pad 23 and is partially formed in contact with an end part T22 of the wiring pattern 22.

Figure 9D:
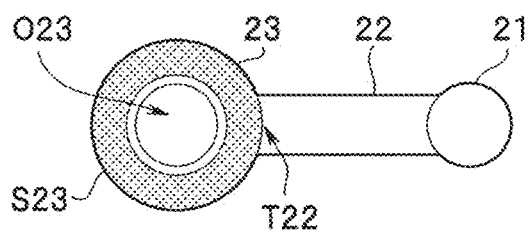
FIG. 9D is a bottom-surface enlarged view of the cavity of the wiring board of the image pickup unit according to the modification of the first embodiment.

The solder nonwetting region S23 in a ring shape illustrated in FIG. 9D has an inner peripheral diameter larger than the opening diameter of the opening O23 and has an outer peripheral diameter substantially equal to the outer peripheral diameter of the second pad 23.

Figure 9E:
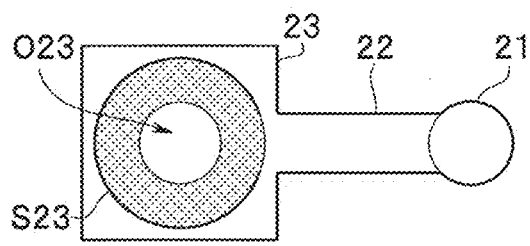
FIG. 9E is a bottom-surface enlarged view of the cavity of the wiring board of the image pickup unit according to the modification of the first embodiment.

The solder nonwetting region S23 in a ring shape illustrated in FIG. 9E surrounds the opening O23 of the second pad 23 in a rectangular shape.

Figure 9F:
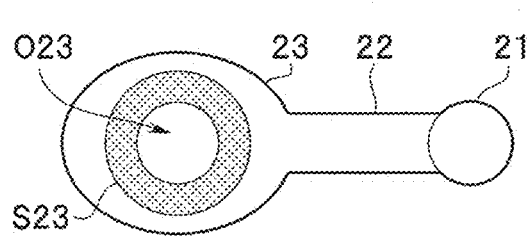
FIG. 9F is a bottom-surface enlarged view of the cavity of the wiring board of the image pickup unit according to the modification of the first embodiment.

The solder nonwetting region S23 in a ring shape illustrated in FIG. 9F surrounds the opening O23 of the second pad 23 in an elliptical shape.

Figure 9G:
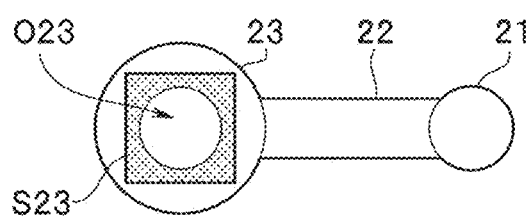
FIG. 9G is a bottom-surface enlarged view of the cavity of the wiring board of the image pickup unit according to the modification of the first embodiment.

The solder nonwetting region S23 illustrated in FIG. 9G has a rectangular shape surrounding the opening O23 of the second pad 23.

The solder 14 does not flow into the second pad 23 in a case where the solder nonwetting region S23 is formed up to an outer periphery of the second pad 23. Thus, reliability of a bonding part is high. The solder nonwetting region S23 (FIG. 9C) formed in contact with the end part T22 of the wiring pattern 22 has same effects as the solder nonwetting region S23 (FIGS. 9A and 9D) formed up to the outer periphery of the second pad.

Figure 9H:
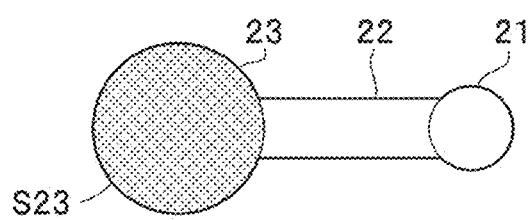
FIG. 9H is a bottom-surface enlarged view of the cavity of the wiring board of the image pickup unit according to the modification of the first embodiment.

The solder nonwetting region S23 illustrated in FIG. 9H is formed on the entire surface of the second pad 23 having no opening. Even with the second pad 23 having no opening, in other words, with the second pad 23 disposed in a region with no through-hole, the solder 14 does not flow into the second pad 23 in a case where the solder nonwetting region S23 is formed. Accordingly, the reliability of the bonding part is high.

An outer shape of each second pad 23 is not limited to a circular shape. Similarly, an outer shape of each first pad 21 is not limited to a circular shape.

A dummy electrode may be disposed on the optical axis O at the bottom surface 10SB of the camera unit 10. In a case of such a configuration, a dummy pad bonded to the dummy electrode by soldering is disposed on the optical axis O at the first principal surface 20SA of the wiring board 20. No wiring pattern is extended from the dummy pad. The dummy electrode may be connected to, for example, an external electrode 13 with ground potential at the imager 11.

<Mounting of Chip Capacitor>

The camera unit 10 is described above as an example of the electronic component bonded to the first pads 21 on the first principal surface 20SA of the wiring board 20 by soldering. Hereinafter, the image pickup unit according to the modification in which the chip capacitor 40 is bonded near the through-holes H20 at the second principal surface 20SB by soldering will be described.

Figure 10:
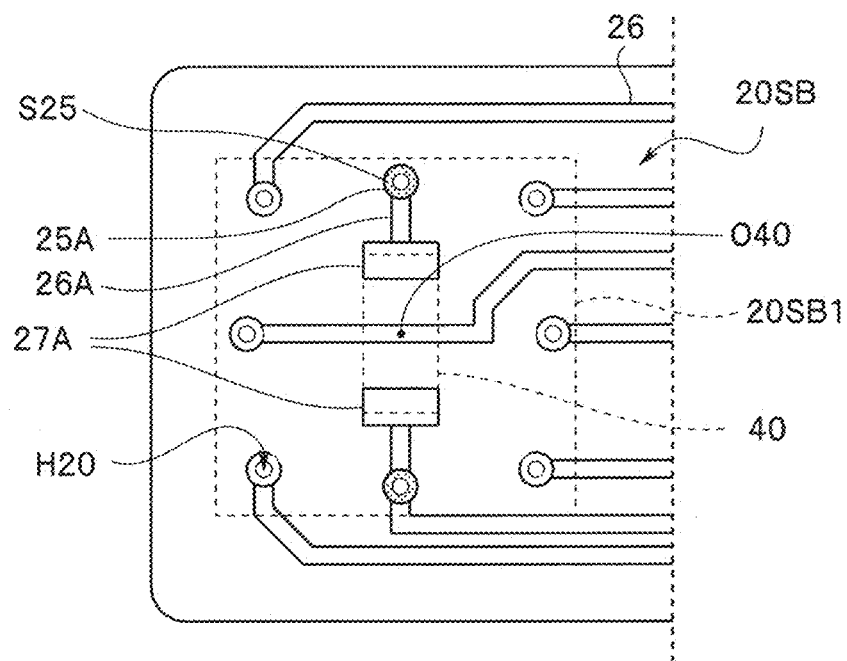
FIG. 10 is a partial plan view of a second principal surface of the wiring board of the image pickup unit according to the modification of the first embodiment.
Figure 11:
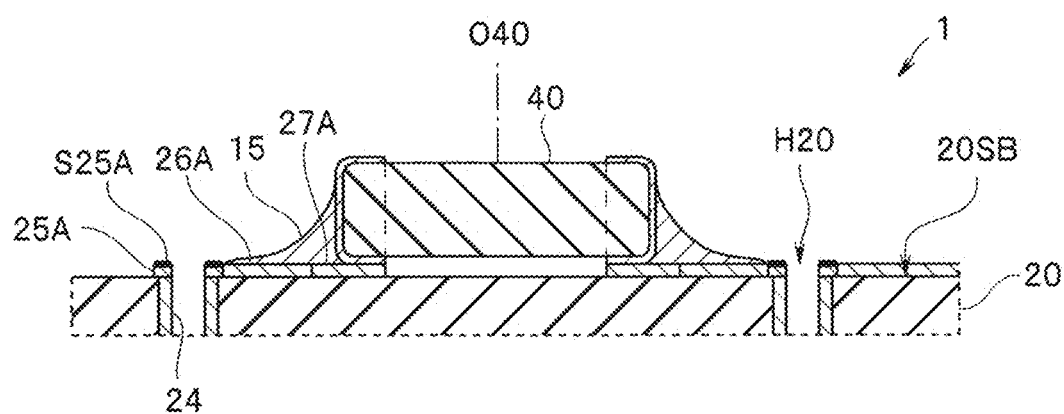
FIG. 11 is a partial cross-sectional view of the wiring board of the image pickup unit according to the modification of the first embodiment.

In the image pickup unit 1 according to the modification illustrated in FIGS. 10 and 11, the chip capacitor 40 is mounted in a region 20SB1 on the second principal surface 20SB opposite a bottom surface (the first principal surface 20SA) of the protrusion 20B.

Each third pad 25A has an opening of a through wiring layer disposed on the wall surface of the corresponding through-hole H20. Two fourth pads 27A to which the chip capacitor 40 is bonded by soldering have substantially rectangular shapes. The fourth pads 27A are connected to the third pads 25A through wiring patterns 26A.

For example, a solder nonwetting region S25 having a same shape as the solder nonwetting region S23 in FIG. 7B is formed on each third pad 25A surrounding the through-hole H20. Each third pad 25A is bonded to no other member by soldering.

The two wiring patterns 26A are routed from the fourth pads 27A to the third pads 25A, respectively, in a symmetric manner with respect to a center O40 of the chip capacitor 40.

Melted solder 15 at end parts of the chip capacitor 40 spreads to the wiring patterns 26A, respectively, in a symmetric manner with respect to the center O40 of the chip capacitor 40. The solder 15 does not flow into the through-holes H20 via the third pads 25A since the solder nonwetting regions S25 are formed.

Accordingly, the chip capacitor 40 is bonded at a desired position by the self-alignment effect and has high bonding reliability.

Note that a wiring board to which an electronic component such as a chip capacitor is bonded by soldering is not limited to a three-dimensional wiring board. For example, even with a plane wiring board, it is possible to assure the reliability of the bonding part by forming solder nonwetting regions on the second pads connected through wiring patterns to the first pads bonded to other members by soldering.

Second Embodiment

Figure 12:
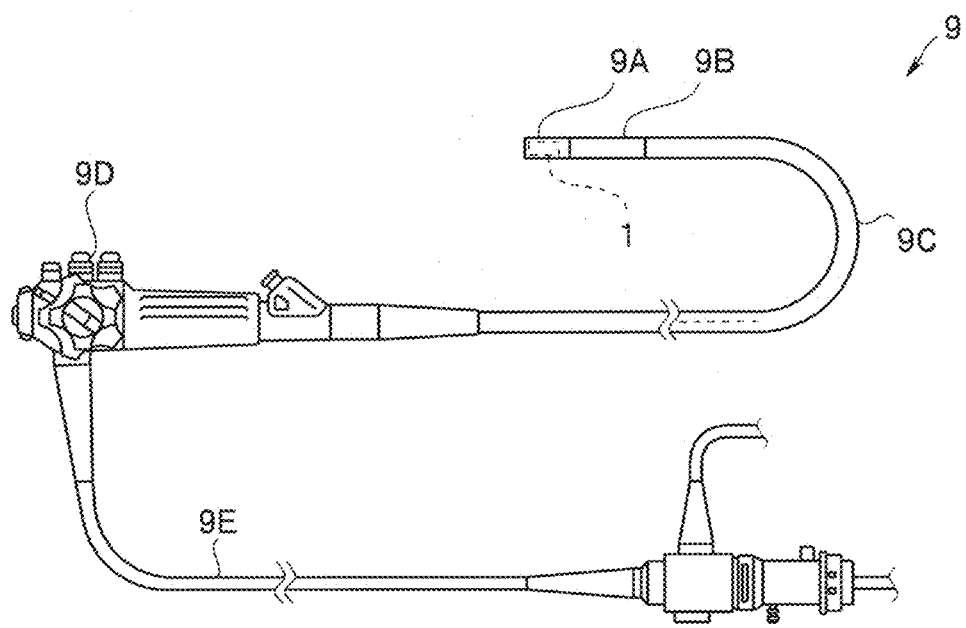
FIG. 12 is a perspective view of an endoscope according to a second embodiment.

As illustrated in FIG. 12, an endoscope 9 according to the present embodiment includes a distal end portion 9A at which the image pickup unit 1 is disposed, a bending portion 9B that is freely bendable and provided continuously with a proximal end of the distal end portion 9A, and a flexible portion 9C having an elongated shape and provided continuously with a proximal end of the bending portion 9B. The bending portion 9B bends in accordance with an operation of an operation portion 9D by a user. The distal end portion 9A, the bending portion 9B, and the flexible portion 9C constitute an insertion portion inserted into a body. A universal code 9E extended from the operation portion 9D is connected to a non-illustrated processor or the like.

The endoscope 9 achieves high reliability and high performance since the endoscope 9 includes the image pickup unit 1.

Note that the endoscope 9 is a medical side-view type flexible endoscope, but an endoscope according to another embodiment may be an industrial endoscope or a rigid endoscope including a rigid straight pipe in place of the flexible portion 9C. Moreover, the image pickup unit 1 may be included in a front-view type endoscope for an object in a distal end direction.

A three-dimensional circuit device is not limited to an MID but may be produced, for example, through fabrication or machining by a 3D printer. A material of the three-dimensional circuit device is not limited to resin but may be ceramic or glass epoxy.

The present invention is not limited to the above-described embodiments and the like but may be provided with various kinds of changes, modifications, and the like without changing the gist of the present invention.

What is claimed is:

1. A wiring board comprising:
   a first principal surface comprising:
   a plurality of first pads configured to bond an electronic component;
   a plurality of second pads configured not to bond another member;
   a plurality of wiring patterns connecting a plurality of first pads to a plurality of second pads, respectively; and
   a solder nonwetting region is formed on each of a plurality of second pads;
   wherein the plurality of wiring patterns are in a symmetric manner relative to a center axis of a bonding region for the electronic component.

2. The wiring board according to claim 1, wherein
   the plurality of second pads are made of a multi-layered film comprising a first layer and a second layer having lower solder wettability than the first layer, and
   the solder nonwetting region is a region in which the second layer is exposed.

3. The wiring board according to claim 2, wherein
the multi-layered film comprising copper, nickel, and gold layers,
the first layer is a gold layer, and
the second layer is a nickel layer.

4. The wiring board according to claim 1, wherein the plurality of wiring patterns have substantially equal lengths.

5. The wiring board according to claim 1, wherein each solder nonwetting region is formed in contact with the respective plurality of wiring patterns.

6. The wiring board according to claim 1, wherein each solder nonwetting region is formed up to an outer periphery of the respective plurality of second pads.

7. A wiring board comprising:
a first principal surface comprising:
one or more first pads configured to bond an electronic component;
one or more second pads configured not to bond another member;
one or more wiring patterns connecting the one or more first pads to the one or more second pads, respectively; and
a solder nonwetting region is formed on each of the one or more second pads;
one or more through-holes extending from the first principal surface to a second principal surface opposite the first principal surface,
wherein a through wiring layer is disposed on wall surfaces of each of the one or more through-holes,
each through-hole has an opening at a center of the one or more second pads, respectively, and
the solder nonwetting region is formed on each of the one or more second pads and surround a respective opening.

8. The wiring board according to claim 7, wherein
the wiring board is a three-dimensional wiring board including a wall having a frame shape, and the wall defining a cavity, and
the first principal surface is a bottom surface of the cavity.

9. The wiring board according to claim 8, wherein the electronic component is a camera unit at least partially disposed in the cavity.

10. The wiring board according to claim 1, wherein an area of each of the respective plurality of second pads is larger than an area of each of the respective plurality of first pads.

11. The wiring board according to claim 1, wherein each of the respective plurality of second pads is positioned radially outside a respective first pad of the respective plurality of first pads.

12. A wiring board comprising:
a first principal surface comprising:
a plurality of first pads configured to bond an electronic component;
a plurality of second pads configured not to bond another member;
a plurality of wiring patterns connecting a plurality of first pads to a plurality of second pads, respectively; and
a solder nonwetting region is formed on each of a plurality of second pads;
wherein a second distance between each adjacent pair of the plurality of second pads is longer than a first distance between each corresponding adjacent pair of the plurality of first pads.

13. The wiring board according to claim 1, wherein
the first principal surface further includes a bonding region configured to bond the electronic component,
the one or more first pads dispose inside the bonding region,
the one or more second pads dispose outside the bonding region.

* * * * *